United States Patent [19]

Cruickshank et al.

[11] Patent Number: 4,516,560
[45] Date of Patent: May 14, 1985

[54] ABRASIVE CUTTING WHEEL AND METHOD OF CUTTING ABRADABLE MATERIAL

[75] Inventors: E. J. Cruickshank, Overland Park, Kans.; Joseph D. Ekland, Birmingham, Mich.

[73] Assignee: Federal-Mogul Corporation, Southfield, Mich.

[21] Appl. No.: 403,201

[22] Filed: Jul. 29, 1982

[51] Int. Cl.$^3$ .............................................. B28D 1/04
[52] U.S. Cl. .................................. 125/15; 51/206 R; 51/267
[58] Field of Search ...................... 125/15, 18; 51/266, 51/267, 206 R

[56] References Cited

U.S. PATENT DOCUMENTS

| | | | |
|---|---|---|---|
| 927,164 | 7/1909 | Puffer | 51/206 R |
| 1,986,849 | 1/1935 | Pohl | 51/206 R |
| 2,564,217 | 8/1951 | Taylor | 51/206 R |
| 3,196,584 | 7/1965 | Tatko | 51/267 |
| 4,337,750 | 7/1982 | Dutcher | 125/15 |

FOREIGN PATENT DOCUMENTS 880772 11/1981 U.S.S.R. ................................ 125/15

Primary Examiner—Harold D. Whitehead
Attorney, Agent, or Firm—Robert F. Hess

[57] ABSTRACT

A circular cutting wheel having a plurality of radial slots evenly spaced about the periphery thereof and a diamond-bearing arcutely shaped cutting member bonded to the periphery thereof between each of the radial slots, the core further including a plurality of coolant pumping vane members formed as arcuate grooves on each side of the core extending radially outwardly from the core in the intended direction of rotation of the blade and terminating at the core periphery, thereby providing the means with which to distribute and maintain a fluid coolant on the sides of the core and to pump such fluid coolant to each of the cutting members. A method of cutting natural and artificial rock materials utilizing such a blade which includes providing a pumping action to a fluid coolant in the area of cut at the blades' cutting edge.

7 Claims, 4 Drawing Figures

ABRASIVE CUTTING WHEEL AND METHOD OF CUTTING ABRADABLE MATERIAL

CROSS-REFERENCE TO RELATED APPLICATION

This invention is related to the copending patent application of Paul B. Ballenger filed on this same date, having Ser. No. 403,200, now abandoned, and its continuation application Ser. No. 646,041, filed Aug. 30,1984, both of which are assigned to the same assignee as is this invention.

BACKGROUND OF THE INVENTION

The present invention relates to abrasive saw blades or cutting wheels and, most specifically to saw blades or type formed by a strong, circular sheet metal drive core having one or more cutting members containing dispersed diamond dust secured around its periphery by a metallic bond and suitable for serious industrial applications. The invention further includes a method of cutting abradable material such as rock like material, with or without reinforcement members such as steel rod, with a blade of the aforementioned type and using a fluid coolant for cooling the blade and carrying away swarf, principally loose rock-like material and coolant, from the area of the cut being made.

Diamond abrasive saws of the metallic bonded variety have been classically divided into three distinct groups, all of which are well known in the trade at the present time. The first of these groups is the serrated or notched rim type blade old in the art and probably the earliest concept of the diamond cutting disk or saw. This type of blade is made by notching or slitting a disk of steel or copper and inserting into these fine hacks a paste of diamond grit and a holding material like petroleum jelly or, more recently, various metal powders. The notched rim type of saw has the merit of being reasonably indestructible but cuts so poorly that it has no real acceptance in any serious industrial applications, although it is satisfactory in the case of the lowest priced blades which are used in home hobby type operations such as the lapidary avocation.

The second group of saw blades consists of a cutting disk having around its periphery a continuous annulus of compressed and matured metallic powder containing diamond dust. This blade has been traditionally made by cold molding the metal powder and diamond dust annulus around a steel body and sintering or otherwise maturing the annulus to a sufficient strength to hold the diamond dust well and to cut freely. This type of blade is functionally superior over the first mentioned group of blades, but it too is unsatisfactory for serios industrial applications since it has the disadvantage of being physically frail and liable to injury in usage, due to the delicate nature of the bond between the annulus and the core. Various mechanical devices have been proposed to improve the bond, but in general due to the shortcomings of the manufacturing method, the cutting disk so made is fragile. Its use is confined in large part to precision operations such as germanium cutting, optical glass cutting, and other nice uses that fall more or less into the instrument making classes.

The third and most recent group of saw blades is the discontinuous rim or segmental type. This cutting disk is made by manufacturing a series of short arcuate segments containing diamond powder in a metallic body. These segments are usually about 2 inches long and are ordinarily silver soldered, brazed or welded to the rim of a steel core which has been divided into sections of approximately the segment length by chopping or sawing the rim radially. Without these discontinuities the saw disk could not readily be made owing to the great stresses created in the disk by heating only its periphery. The segmented blade has been accepted by those fields that are prone to give the hardest usage to the blades, such as the concrete sawing and masonry cutting field where rough abrasive cutting is done. For such applications it is common to flush the cutting area continuously during the cutting operation with a fluid coolant in order to keep the blade as cool as possible and to flush from such area loose rock-like material, spent abrasive and the like, all of which in combination with the coolant itself is generally referred to in the art and throughout this description of our invention as "swarf". Prior to our invention little or no thought had been given to the idea of utilizing the blade construction itself to create a more effective means of providing greater cooling of the wheel, or delivering coolant to the immediate area or point at which the wheel is making the cut or as a means of flushing the swarf from the side faces of the cutting wheel at the time it lies within that portion of the cut or cut groove which is being made, other than that taught in the aforementioned related application Ser. No. 403,200.

SUMMARY OF THE INVENTION

Having in mind the shortcomings of the prior art cutting wheels or at least those intended for applications wherein a fluid is continuously supplied to the blade to cool it and flush the cut, my invention includes a circular cutting wheel having a plurality of radial slots evenly spaced about the periphery thereof and a diamond-bearing arcuately shaped cutting member bonded to the periphery thereof between each of the radial slots, the core further including a plurality of coolant pumping vane members formed as arcuate grooves on each side of the core extending radially outwardly from the core in the intended direction of rotation of the blade and terminating at the core periphery, thereby providing the means with which to distribute and maintain a fluid coolant on the sides of the core and to pump such fluid coolant to each of the cutting members. My invention also includes a method of cutting an abradable material, such as natural and artificial rock materials, utilizing such a cutting wheel which includes the steps of entrapping a certain amount of fluid coolant on the side faces of the wheel, uniformly distributing such coolant over a major radially outermost portion of each such side face and pumping it to the radially outermost portions of the wheel, that is the cutting edge, and simultaneously pumping the swarf from the cutting edge of the wheel and into the cut.

Accordingly, an object of the invention is to provide a new and improved diamond abrasive cutting wheel of the kind described.

Another object of the invention is to construct a cutting wheel in such manner as to provide a means for pumping a fluid coolant and to pump such coolant to the outermost extremities of the cutting wheel.

Another object is to provide a cutting wheel capable of more effectively delivering a fluid coolant to the area being cut by the cutting wheel and to portions of the cutting wheel itself.

A further object of the invention is to provide a method of cutting abradable material with a cutting wheel of the kind described in such manner as to provide more fluid coolant in the area of the cut from a given source than has heretofore been known to those skilled in the art.

Yet a further object of the invention is to provide a process of cutting abradable material using a fluid coolant to cool and flush swarf from the cutting wheel and using the cutting wheel itself to increase the cooling and flushing action of the coolant over that heretofore known in the art.

These and other desirable objects may be attained in the manner disclosed as an illustrative embodiment of the invention in the following description and in the accompanying drawings forming a part hereof.

DESCRIPTION OF THE PREFERRED EMBODIMENT

Figure 1:
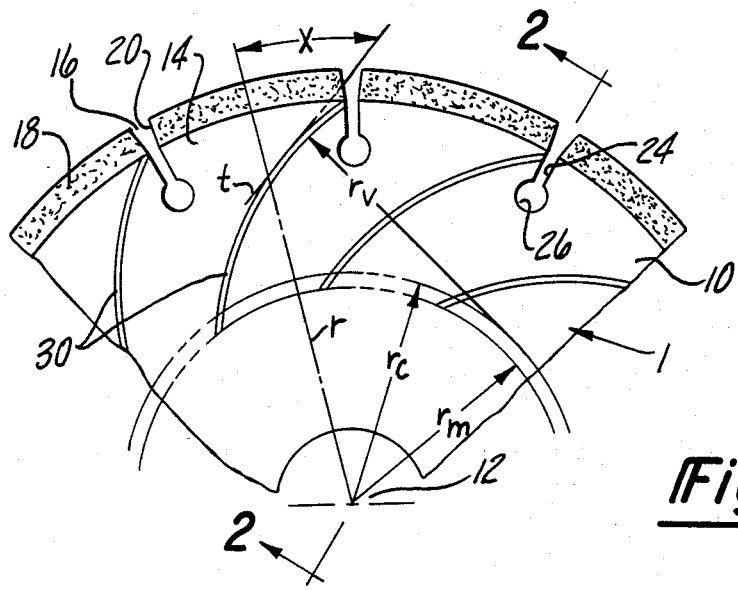
FIG. 1 is a fragmentary face view of a cutting wheel according to a preferred embodiment of the invention.

In FIG. 1 is illustrated a diamond abrasive cutting wheel or blade generally designated as 1 including a central sheet metal drive disk or core 10 made of suitable wrought metal, preferably steel, and provided with a central aperture or arbor hole 12 for mounting the blade on a rotating shaft. The periphery of the core is segmented so as to provide a plurality of cutting segments 14 and a gullet 16 between each adjacent pair of cutting segments 14. Upon a base located at the radially extremity of each cutting segment 14 there is bonded a diamond-bearing cutting element or member 18.

Figure 2:
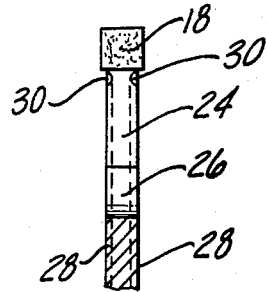
FIG. 2 is a fragmentary radial cross section of the cutting wheel of FIG. 1 taken approximately on the line 2—2 thereof through a gullet.

As viewed from the face of the saw blade, the cutting elements are arcuate. The bases of the cutting segments are circular arcs having the center of the core 10 as their centers of curvature. The ends 20 of each cutting element 18 are squared off, i.e. each end is perpendicular to a line tangent to the cutting element periphery at the ends thereof. Such construction is common practice. The cutting members are composed of diamond grit embedded and dispersed in a hard matrix material such as a mixture of bronze and iron. The particular metal mixture mentioned is preferred at the present time, but it is understood that the scope of the invention covers any suitable hard abrasive grit dispersed in any suitable hard mixture material. As seen in FIG. 2, the cutting members 18 are approximately rectangular in cross section and have a slightly greater width than the core 10 to extend outwardly beyond the surfaces of the core 10 by a small equal amount at either side. The diamond bearing elements or sections 18 are wider than the body of the core 10 to provide for clearance during cuttings.

The gullets are bounded by respective side faces 24 of each adjacent pair of cutting segments. Each pair of side faces 24 forming a gullet are generally parallel to one another so as to form a radial slot, the depth of which is a matter of choice and selected based upon consideration of relieving thermal stresses caused when the cutting elements are bonded to the core.

A drill hole 26 is made approximately at the radially innermost end of each gullet 16 for purposes of relieving stresses which might otherwise be created at a more narrow juncture of the side faces 24.

Thus far the cutting wheel 1 described is one of standard construction well known and widely used in the art. Our invention includes, in its preferred form, providing the cutting wheel on both sides 28 with a plurality of impeller or vane members 30. Each vane is formed in the side face as by etching or machining. The depth and width of the groove is largely a matter of choice. Given that a function of the vane members is to entrap a fluid coolant on the blade it would seem that the wider and deeper grooves will perform such a function best. However blade core thickness limits the possible groove depth selections. Furthermore, we believe that a more important function of the vane members is to literally pump coolant that is adjacent the cutting wheel side faces to the radially outermost portions of the wheel. This pumping action delivers coolant directly and under force to the cut and also, at the same time, sweeps the side faces clear of the swarf. To accomplish this pumping action we believe a depth of no more than 0.001 inches is required. Nevertheless a groove depth up to approximately 0.004 inches is probably permissible with cutting wheels or blades of standard size and construction, namely the 14 inch to 26 inch diameter blades typically used for cutting concrete and the like.

Each vane begins at the proximate radial midpoint $r_m$ of the core. Preferably the vane members are arcuately shaped along the arc scribed about a common radius $r_v$. The pivotpoint of each radius $r_v$ lies on a common circular arc having a radius $r_c$ and being concentric with the center of the core. The arc of each vane member is selected on the basis of a desired angle rather than any particular length of radius $r_v$. Angle X is the angle included between a line r radiating from the center of the core and intersecting the vane member a distance approximately 40 percent inward of the vane's circumference starting at the periphery of the core and a line t tangent to the arc of the vane member at that intersection point. We prefer that angle X lie within the range from approximately 65° to 85°, and believe that the most effective angle will be that of about 72°. This is an approximate implementation based on the most practical means of manufacture for wheels of generally 14 inch to 26 inch diameter. Ideally, we would prefer the vane start as an arc at the core midpoint but be linear at the wheels circumference. Along with this we prefer an optimum included angle X be of 72° formed between such linear portion of the vane at the point it intersects the wheel's circumference and a line r radiating from the center of the core and intersecting the vane member at such point on the circumference. However, at present we know of no practical means for economically manufacturing a cutting wheel having this ideal vane structure. Therefore, we prefer the vane structure first described which we believe more readily leads itself to economical manufacture.

Figure 3:
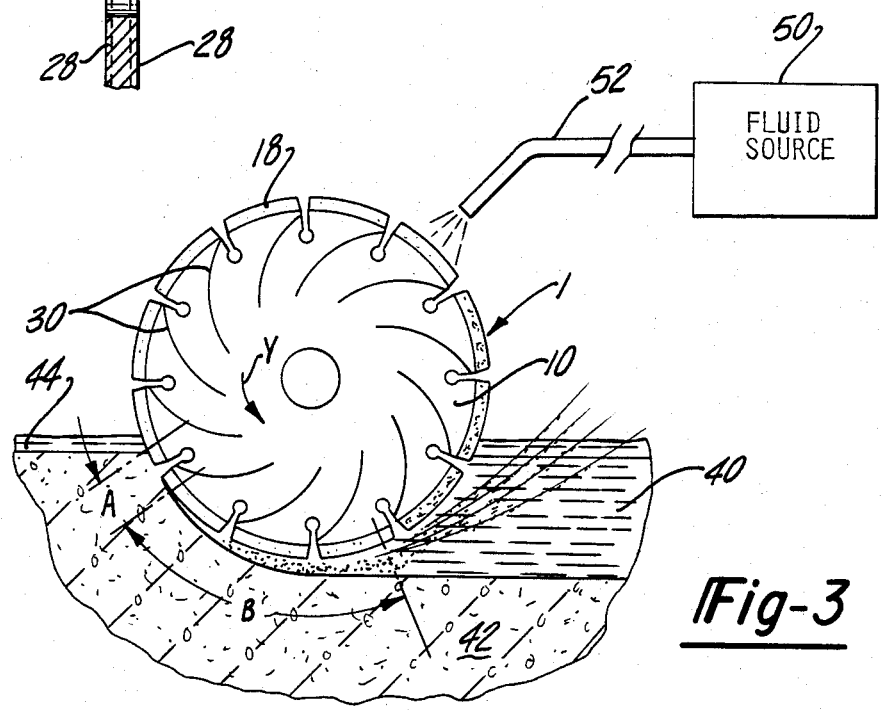
FIG. 3 is a generally schematic perspective view of the cutting system according to a preferred embodiment of the invention.

In FIG. 3 there is shown a representation of cutting wheel 1 making a cut or groove 40 in a slab of abradable material 42. Typically, the cutting wheel is mounted on a drive arbor of a saw. The saw includes a motor (not shown) for driving the arbor shaft and thus the blade 1. It also includes a fluid source 50 shown schematically for continuously providing a fluid coolant under constant pressure to the blade cutting via a hose 52 leading to a blade shroud (not shown). Such a saw by itself as described is of standard construction and therefore forms no part of our invention and is not shown. The cutting wheel is driven in the direction of arrow Y so that it cuts down into the material 42.

As it does so, a fluid coolant is continuously supplied from source 50 at the uppermost portions of the blade. Generally, the coolant is supplied in substantial quantities sufficient to flood the surface 44 of the material 42 being cut. We have found however that this flooding at the surface 44 does not assure that necessary amounts of coolant will be supplied to the juncture of the blade with the end of the groove being cut during the course of the cutting operation. This juncture is noted in FIG. 3 as constituting a zone A. The depth of this zone will vary from a point at the surface 44 to the full depth of the groove 40 dependent on how hard or fast the operator pushes the saw, but in all cases wherein conventional saw blades of the type described above are used, it is known that the amounts of coolant fluid delivered to this zone is inadequate. In our preferred embodiments, each impeller or vane member 30 picks up or entraps the coolant, either as coolant is delivered from the source 50 or as it lies on the surface 44 or both, and impels such coolant to the radial extremities of the wheel. This results in a cooler cut within zone A. A second zone B is shown which represents the area in which the abraded material, spent abrasives and the like mix with the coolant to form the swarf. Within this zone, the action of impellers or vane members 30 on the coolant causes the coolant to be swept outwards of the radial extremities of the wheel, or at least away from or substantially out of contact with the sides of the wheel. This eliminates a major disadvantage of the prior art wheels, namely that of undercutting of the steel core at or near the juncture with the diamond cutting members. This undercutting is caused by the abrasive action of the swarf on the steel core as the core is rotating at great speeds relative to a substantial stagnant pool of swarf which is allowed to remain at the bottom of the groove. With our invention, the swarf is swept from zone B at the bottom of the groove by the unusually large amounts and force of coolant the vane members constantly deliver to this area.

Figure 4:
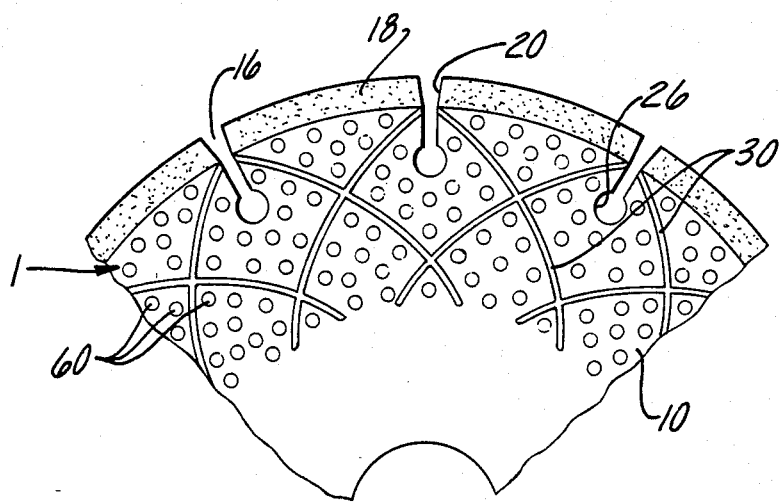
FIG. 4 is a fragmentary face view of a cutting wheel according to a modification of a preferred embodiment of the invention.

In FIG. 4, wherein like references are used to denote the same blade features shown and described respecting FIG. 1, there is shown another preferred embodiment of the invention wherein the vane members 30 are arranged on the core in pairs and one vane member of each pair is inclined in exactly the opposite direction as the other vane of such pair. Other than that, their construction is as described with respect to FIG. 1. Further, there is shown a plurality of indentations 60 randomly spaced throughout each side face within the same radial extremities as the vane members. These indentations 60 are spheroidal or dimple shaped ranging in diameter anywhere up to about ⅛ inch in diameter and having a depth of no more than about 0.004 inches on standard size cutting wheels. Machining or etching is considered a satisfactory method of forming the indentations. The purpose of the indentations is to entrap fluid coolant on the sides of the wheel or blade and assure a uniform distribution and maintainance of a fluid coolant on the side faces of the blades as it is turning through the cut being made. In this sense, the function of indentations 60 is the same as that of the vane members 30 and it is therefore within the scope of our invention to construct a blade which includes only indentations 60 and not the vane members 30.

It is to be understood that the aforedescribed preferred embodiments are not limiting but is merely illustrative of the invention, and various modifications thereof may be made by one skilled in the art without departing from the spirit and scope of the invention as defined by the appended claims.

We claim:

1. A rotatable cutting wheel for wet cutting of natural or artifical rock or rock-like material, comprising:

a generally circular disc-shaped drive core having a pair of opposite core faces and a plurality of circumferentially-extending and circumferentially-spaced support surfaces generally at the outer periphery thereof, a substantial number of said support surfaces having affixed thereto an abrasive cutting member capable of cutting abradable rock or rock-like material;

said core having a plurality of gullets, at least a substantial number of said gullets extending between a closed gullet end located a substantial radial distance inward of said support surfaces and an open gullet end defined by the space between adjacent pairs of said support surfaces;

said core having a plurality of vane means thereon for distributing a fluid coolant therethrough over at least one of said core faces, for directing said fluid coolant from at least one core face generally radially outwardly to at least some of said cutting members and for maintaining a quantity of said fluid coolant on at least said one core face as said core is rotating through the cut being made;

said vane means including a plurality of generally arcuate vanes circumferentially-spaced on at least one core face, said arcuate vanes curving outwardly from radial inward locations on at least said one core face that are approximately radially midway between said supporting surfaces and the axis of rotation of said core, each of said vanes being recessed relative to at least one core face and being in fluid communication with one of said gullets, said arcuate vanes extending in a generally radially outward and circumferential arcuate direction from said radial inward locations to said gullets, each of said arcuate vanes being configured so that a radius line from the core's axis to an intersection point on said vane approximately 40 percent inwardly along said vane from the periphery of said core forms an included angle of approximately 65° to approximately 85° with a tangent line that is tangent to said vane at said intersection point.

2. A rotatable cutting wheel according to claim 1, further including a plurality of depressions on at least one core face for further distributing said fluid coolant over at least one core face and for further maintaining said quantity of fluid coolant on at least said one core face as said core is rotating, said depressions being generally dimple-shaped and having a maximum diameter of approximately 0.125 inch and a maximum depth of approximately 0.004 inch.

3. A rotatable cutting wheel according to claim 1, including said vanes on both of said core faces.

4. A rotatable cutting wheel according to claim 3, wherein the maximum depth of said recessed vanes is approximately 0.004 inch.

5. A rotatable cutting wheel according to claim 4, further including a plurality of depressions on at least said one core face for further distributing said fluid coolant over at least said one core face and for further maintaining said quantity of fluid coolant on at least said one core face as said core is rotating, said depressions being generally dimple-shaped and having a maximum diameter of approximately 0.125 inch and a maximum depth of approximately 0.004 inch.

6. A rotatable cutting wheel according to claim 1, wherein said arcuate vanes are arranged in pairs on at least said one core face, said arcuate vanes of each of said pairs having their radially outermost ends generally radially adjacent one another and in fluid communication with opposite circumferential sides of a corresponding one of said gullets at a location generally radially adjacent said open gullet end, said arcuate vanes of each of said pairs arcuately curving generally radially outwardly but in opposite circumferential directions.

7. A rotatable cutting wheel according to claim 1, wherein said included angle is approximately 72°.

* * * * *

UNITED STATES PATENT AND TRADEMARK OFFICE
CERTIFICATE OF CORRECTION

PATENT NO. : 4,516,560
DATED       : May 14, 1985
INVENTOR(S) : E. J. Cruickshank and Joseph D. Ekland It is certified that error appears in the above-identified patent and that said Letters Patent is hereby corrected as shown below:

Column 1, line 53, "serios" should read "serious".

Column 3, line 63, "cuttings" should read "cutting".

Column 5, line 2, after "cutting" insert "area".
Column 5, line 38, after "diamond" insert "bearing".
Column 5, line 65, "maintainance" should read "maintenance".

Column 6, line 1, after "30" insert ",".
Column 6, line 2, after "only" insert "the".
Column 6, line 31, after "least" insert "said".
Column 6, line 36, after "least" insert "said".
Column 6, line 42, after "least" insert "said".
Column 6, line 56, after "least" insert "said".
Column 6, line 57, after "face" insert "and".

Signed and Sealed this

Twelfth Day of August 1986

[SEAL]

Attest:

DONALD J. QUIGG

Attesting Officer    Commissioner of Patents and Trademarks